(12) United States Patent
Park et al.

(10) Patent No.: US 11,024,865 B2
(45) Date of Patent: Jun. 1, 2021

(54) ANTIOXIDANT FOR FUEL CELLS AND MEMBRANE-ELECTRODE ASSEMBLY INCLUDING THE SAME

(71) Applicants: Hyundai Motor Company, Seoul (KR); Kia Motors Corporation, Seoul (KR); Industry Foundation of Chonnam National University, Gwangju (KR)

(72) Inventors: In Yu Park, Seoul (KR); Bo Ki Hong, Seoul (KR); Jae Jun Ko, Gyeonggi-do (KR); Aniket Kumar, Gwangju (KR); Sun Ju Song, Gwangju (KR); Jae Woon Hong, Jeollanam-do (KR)

(73) Assignees: Hyundai Motor Company, Seoul (KR); Kia Motors Corporation, Seoul (KR); Industry Foundation of Chonnam National University, Gwangju (KR)

( * ) Notice: Subject to any disclaimer, the term of this patent is extended or adjusted under 35 U.S.C. 154(b) by 52 days.

(21) Appl. No.: 16/450,313

(22) Filed: Jun. 24, 2019

(65) Prior Publication Data
US 2020/0266473 A1 Aug. 20, 2020

(30) Foreign Application Priority Data
Feb. 14, 2019 (KR) .......................... 10-2019-0017284

(51) Int. Cl.
| | | |
|---|---|---|
| *H01M 8/10* | (2016.01) | |
| *H01M 8/1051* | (2016.01) | |
| *H01M 8/1004* | (2016.01) | |
| *H01M 4/86* | (2006.01) | |
| *H01M 8/1032* | (2016.01) | |
| *H01M 8/1027* | (2016.01) | |
| *C01G 19/02* | (2006.01) | |
| *H01M 8/1039* | (2016.01) | |
| *H01M 8/1018* | (2016.01) | |

(52) U.S. Cl.
CPC .......... *H01M 8/1051* (2013.01); *C01G 19/02* (2013.01); *H01M 4/8663* (2013.01); *H01M 8/1004* (2013.01); *H01M 8/1027* (2013.01); *H01M 8/1032* (2013.01); *H01M 8/1039* (2013.01); *C01P 2002/54* (2013.01); *C01P 2006/40* (2013.01); *H01M 2008/1095* (2013.01); *H01M 2250/20* (2013.01); *H01M 2300/0082* (2013.01)

(58) Field of Classification Search
CPC ............. H01M 8/1051; H01M 8/1027; H01M 8/1032; H01M 8/1004; H01M 8/1039
See application file for complete search history.

(56) References Cited

U.S. PATENT DOCUMENTS

2011/0287335 A1* 11/2011 Akita .................. H01M 8/1051
429/482

OTHER PUBLICATIONS

Zhang et al. (Catalysis Communications 9, 2008, 1259-1264.*
(Continued)

*Primary Examiner* — Olatunji A Godo
(74) *Attorney, Agent, or Firm* — Mintz Levin Cohn Ferris Glovsky; Peter F. Corless

(57) ABSTRACT

Disclosed are an antioxidant for fuel cells and a membrane-electrode assembly including the same. The membrane-electrode assembly may have obtained greatly improved durability by using an antioxidant having a novel composition that may provide excellent antioxidant activity and long-term durability.

4 Claims, 5 Drawing Sheets

(56) References Cited

OTHER PUBLICATIONS

Zhao et al. (Journal of Membrane Science 421-422, 2012, 201-210).*

Schlick et al., "Scavenging of Hydroxyl Radicals by Ceria Nanoparticles Effect of Particle Size and Concentration", (2016)6885-6890_J Phys Chem C.

Deshpande et al., "Size dependency variation in lattice parameter and valency states in nanocrystalline cerium oxide", (2005)133113_Appl. Phys. Lett.

\* cited by examiner

ANTIOXIDANT FOR FUEL CELLS AND MEMBRANE-ELECTRODE ASSEMBLY INCLUDING THE SAME

CROSS-REFERENCE TO RELATED APPLICATION

This application claims, under 35 U.S.C. § 119(a), the benefit of priority to Korean Patent Application No. 10-2019-0017284 filed on Feb. 14, 2019, the entire contents of which are incorporated herein by reference.

TECHNICAL FIELD

The present invention relates to an antioxidant for fuel cells and a membrane-electrode assembly including the same. The membrane-electrode assembly may have greatly improved durability due to an antioxidant thereby providing excellent antioxidant activity and long-term durability.

BACKGROUND

Polymer electrolyte membrane fuel cells for vehicles are devices which generate electricity through an electrochemical reaction between hydrogen and oxygen in the air and are well-known as environmentally friendly next-generation energy sources that have high electricity generation efficiency and almost no exhaust materials other than water. In addition, fuel cells generally operate at a temperature of 95° C. or less and have high power density.

The reaction for electricity production by fuel cells occurs in a membrane-electrode assembly (MEA) which includes a perfluorinated sulfonic acid ionomer-based membrane and a pair of electrodes, i.e. an anode and a cathode. For example, hydrogen supplied to an anode, which is an oxidation electrode for fuel cells, is split into a proton and an electron, and then the proton is moved through the membrane to a reduction electrode, that is, a cathode, and the electron is moved via an exterior circuit to the cathode. Then, at the cathode, an oxygen molecule, the proton and the electron react together to produce electricity and heat, and at the same time, water ($H_2O$), as a by-product.

In general, hydrogen and oxygen in the air, which are reaction gases for fuel cells, crossover through the electrolyte membrane to facilitate the production of hydrogen peroxide (HOOH). The hydrogen peroxide produces oxygen-containing radicals such as a hydroxyl radical (.OH) and a hydroperoxyl radical (.OOH). These radicals attack the perfluorinated sulfonic acid-based electrolyte membrane, inducing chemical degradation of the membrane, which ultimately has negative impact of reducing the durability of fuel cells.

In the related art, in order to mitigate such chemical degradation of the electrolyte membrane, the addition of various kinds of antioxidants to the electrolyte membrane has been suggested. For example, such antioxidants include primary antioxidants functioning as radical scavengers, secondary antioxidants functioning as hydrogen peroxide decomposers, and the like. In addition, the primary antioxidants include cerium-based antioxidants such as cerium oxide and cerium (III) nitrate hexahydrate antioxidants, terephthalate-based antioxidants and the like. The secondary antioxidants include manganese-based antioxidants such as manganese oxide antioxidants.

However, in the related arts, it has been reported that S. Schlick et al., *J. Phys. Chem. C*, 120, 6885-6890 (2016); S. Deshpande et al., *Appl. Phys. Lett.*, 8, 133113 (2005) reported that, in general, cerium oxide has a problem that antioxidant activity is inversely proportional to long-term stability. There is an urgent need for research on novel antioxidants with both better antioxidant activity and excellent long-term stability.

The above information disclosed in this Background section is provided only for enhancement of understanding of the background of the invention and therefore it may contain information that does not form the prior art that is already known in this country to a person of ordinary skill in the art.

SUMMARY OF THE INVENTION

In preferred aspects, provided is a membrane-electrode assembly that has greatly improved durability by containing a novel antioxidant having excellent antioxidant activity as well as superior long-term stability.

The objects of the present invention are not limited to those described above. The objects of the present invention will be clearly understood from the following description and may be implemented by the means defined in the claims and combinations thereof.

In one aspect, provided is an antioxidant for fuel cells that may include tin (Sn) and cerium oxide ($CeO_2$). Preferably, the cerium oxide may be doped with the tin (Sn).

The Sn-doped cerium oxide may be suitably obtained by substituting at least a portion of cerium (IV) ions ($Ce^{4+}$) in the cerium oxide with tin ions ($Sn^{2+}$).

The Sn-doped cerium oxide may be represented by the following Formula 1:

$$Sn_xC_{1-x}O_{2-\delta} \qquad \text{[Formula 1]}$$

wherein x satisfies $0<x\leq0.5$ and $\delta$ is an oxygen vacancy value making the compound of Formula 1 electrically neutral.

The Sn-doped cerium oxide may be suitably synthesized under a hydrogen atmosphere.

The term "hydrogen atmosphere" as used herein refers to a reaction condition or chemical environment that is substantially elevated concentration of hydrogen gas, or substantially saturated with hydrogen gas, for example, in order to provide reducing atmosphere. For instance, under the hydrogen atmosphere, reduction and/or oxidation material (e.g., metal ions) may occur.

In another aspect, provided is a membrane-electrode assembly for fuel cells. The membrane-electrode assembly may include an electrolyte membrane and a pair of electrodes formed on both surfaces of the electrolyte membrane. Preferably, at least one of the electrolyte membrane and the electrodes may include the antioxidant as described herein.

The electrolyte membrane may include a perfluorinated sulfonic acid-based ionomer and an antioxidant.

The term "perfluorinated sulfonic acid-based ionomer" as used herein refers to an ionomer compound containing perfluorinated alkyl sulfonic acid (e.g., $CF_3(CF_2)_nSO_3H$, n is 0-30), which may provide polymeric chain (e.g., perfluoroalkyl backbone) and pendent group (e.g., ionic sulfonic acid). It is appreciated that conventional ionomers, such as polystyrene sulfonate, and NAFION (Dupont), can provide suitable perfluorinated sulfonic acid-based ionomers used in the present invention.

The electrolyte membrane may include the antioxidant in an amount of about 0.05% by weight to about 20% by weight, based on a total weight of the perfluorinated sulfonic acid-based ionomer and the antioxidant.

The electrolyte membrane may further include a porous reinforcement layer. Preferably, the electrolyte membrane may include the perfluorinated sulfonic acid-based ionomer and the antioxidant impregnated into the reinforcement layer.

Also provided is a fuel cell that may include the membrane-electrode assembly as described herein.

Further provided is a vehicle that may include the fuel cell as described herein.

Other aspects of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein:

FIG. 4A shows the result of Example 1, FIG. 4B shows the result of Comparative Example 1, and FIG. 4C shows the result of Comparative Example 2;

DETAILED DESCRIPTION

Figure 1:
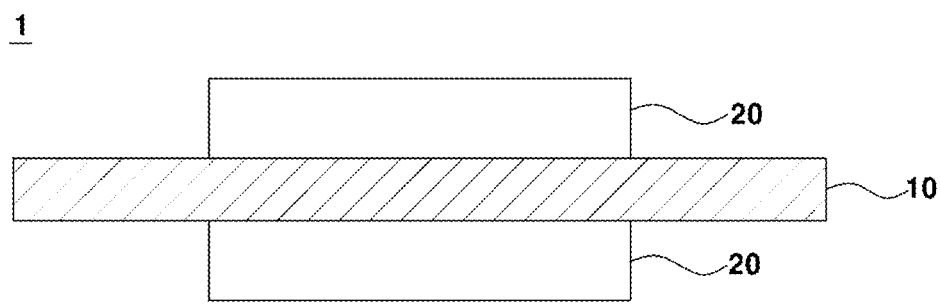
FIG. 1 is a sectional view schematically illustrating an exemplary membrane-electrode assembly according to an exemplary embodiment of the present invention.

The objects described above, and other objects, features and advantages will be clearly understood from the following preferred embodiments with reference to the annexed drawings. However, the present invention is not limited to the embodiments and will be embodied in different forms. The embodiments are suggested only to offer thorough and complete understanding of the disclosed contents and sufficiently inform those skilled in the art of the technical concept of the present invention.

It will be understood that the terms "comprise", "include", "have", etc. and the like, when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element, or an intervening element may also be present. It will also be understood that, when an element such as a layer, film, region or substrate is referred to as being "under" another element, it can be directly under the other element, or an intervening element may also be present.

As used herein, the singular forms "a," "an" and "the" are intended to include the plural forms as well, unless the context clearly indicates otherwise.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Unless mentioned otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" should modify all such numbers, figures and/or expressions. For example, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about." In addition, when numeric ranges are disclosed in the description, these ranges are continuous and include all numbers from the minimum to the maximum including the maximum within each range unless otherwise defined. Furthermore, when a range refers to integer values, it includes all integers from the minimum to the maximum including the maximum within the range, unless otherwise defined.

FIG. 1 is a sectional view schematically illustrating an exemplary membrane-electrode assembly 1 according to an exemplary embodiment of the present invention. The membrane-electrode assembly 1 may include an electrolyte membrane 10 and a pair of electrodes 20 formed on both surfaces of the electrolyte membrane 10. Here, the term "a pair of electrodes" means an anode and a cathode, which face each other based on the electrolyte membrane.

Preferably, at least one of the electrolyte membrane 10 and the pair of electrodes 20 may include an antioxidant.

Figure 2:
FIG. 2 is a sectional view schematically illustrating an exemplary configuration of an exemplary electrolyte membrane according to an exemplary embodiment of the present invention.

FIG. 2 is a sectional view schematically illustrating an exemplary configuration of an exemplary electrolyte membrane 10 according to an exemplary embodiment of the present invention. The electrolyte membrane 10 may be a single layer containing a mixture 11 of a perfluorinated sulfonic acid-based ionomer and an antioxidant.

Figure 3:
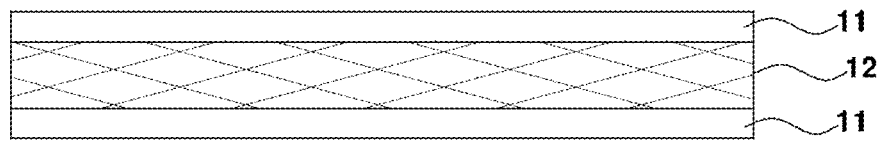
FIG. 3 is a sectional view schematically illustrating an exemplary configuration of an exemplary electrolyte membrane according to an exemplary embodiment of the present invention.

FIG. 3 is a sectional view schematically illustrating an exemplary configuration of an exemplary electrolyte membrane 10 according to an exemplary embodiment of the present invention. The electrolyte membrane 10 may have a tri-layer structure in which a reinforcement layer may be further included to improve mechanical rigidity, and the mixture 11 of a perfluorinated sulfonic acid-based ionomer and an antioxidant may be impregnated into the reinforcement layer.

The reinforcement layer 12 may be a porous membrane containing expanded polytetrafluoroethylene (e-PTFB) and having therein numerous pores.

However, the configuration of the electrolyte membrane 10 in the present invention is not limited to those shown in FIGS. 2 and 3, and any configuration can be used so long as it includes a perfluorosulfonic acid-based ionomer for ion conduction and an antioxidant.

The electrolyte membrane 10 may include the antioxidant in an amount of about 0.05% by weight to about 20% by weight, based on the total weight of the perfluorinated sulfonic acid-based ionomer and the antioxidant. For instance, when the content of the antioxidant is less than about 0.05% by weight, the chemical durability of the electrolyte membrane may not be improved due to the excessively low antioxidant activity, and when the content is greater than about 20% by weight, the proton conductivity of the electrolyte membrane may be decreased and brittleness may be increased.

Preferably, the perfluorinated sulfonic acid-based ionomer may suitably include Nafion. In certain embodiments, the perfluorinated sulfonic acid-based ionomer may be Nafion.

Preferably, the antioxidant may suitably include Sn-doped cerium oxide.

The Sn-doped cerium oxide may have increased oxygen vacancy and thus provide improved redox reactivity of cerium ions by substituting at least a portion of cerium (IV) ions ($Ce^{4+}$) in cerium oxide ($CeO_2$) having a fluorite structure with tin ions ($Sn^{2+}$).

The Sn-doped cerium oxide may be represented by the following Formula 1.

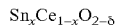

$$Sn_xCe_{1-x}O_{2-\delta}$$ [Formula 1]

wherein x satisfies 0<x≤0.5 and δ is an oxygen vacancy value making the compound of Formula 1 electrically neutral, for example, 0<δ≤0.5.

When x is greater than 0.5, the inherent structural properties of cerium oxide may be deteriorated. For this reason, x is preferably within the range.

The antioxidant may be synthesized by various methods such as a hydrothermal synthesis method, a flame hydrolysis deposition method, and a sol-gel autocombustion method. Preferably, the antioxidant may be synthesized by hydrothermal synthesis under a hydrogen atmosphere for cerium reduction. The method of synthesizing a tin-doped cerium oxide nanopowder may include dissolving a cerium salt and a tin salt in distilled water at an appropriate stoichiometric ratio, followed by reacting and mixing for about 2 hours, adding a nitric acid solution thereto to maintain the pH at 9, forming a tin-doped cerium oxide precipitate, washing the tin-doped cerium oxide precipitate, and performing calcination in a hydrogen-containing atmosphere at a temperature of 100 to 750° C.

Example

Hereinafter, the antioxidant according to various exemplary embodiments of the present invention will be described in more detail with reference to the following Examples. However, these examples are provided only for illustration of the present invention and should not be construed as limiting the scope of the present invention.

Antioxidant Activity Evaluation—Methyl Violet Method

A methyl violet method offering rapid naked eye inspection was used to evaluate antioxidant activities.

Methyl violet was mixed with iron (II) sulfate heptahydrate ($FeSO_4 \cdot 7H_2O$), hydrogen peroxide and an antioxidant and then changes in color were observed.

As the antioxidant activity of the antioxidant increases, violet, the original color of methyl violet, is maintained, and as the antioxidant activity decreases, the violet turns pale and finally changes to colorless.

First, methyl violet, iron sulfate heptahydrate and hydrogen peroxide were mixed at a molar ratio of 1:40:40 to prepare a methyl violet test solution.

In Example 1, about 3 mg of tin-doped cerium oxide ($Sn_{0.25}Ce_{0.75}O_{2-\delta}$, wherein δ is an oxygen vacancy value making the antioxidant electrically neutral) synthesized under a hydrogen atmosphere was added as an antioxidant to the methyl violet test solution. In Comparative Example 1, no antioxidant was added. In Comparative Example 2, about 3 mg of cerium oxide ($CeO_2$), synthesized in a hydrogen atmosphere, was added as an antioxidant.

Figure 4A:
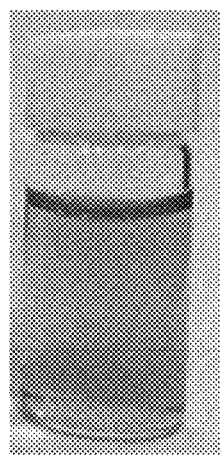
FIGS. 4A-4C show the results of evaluation of antioxidant activities of Example 1, Comparative Example 1 and Comparative Example 2 of the present invention using a methyl violet method.
Figure 4B:
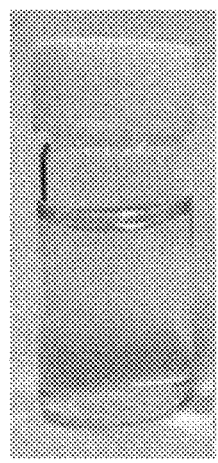
Figure 4C:
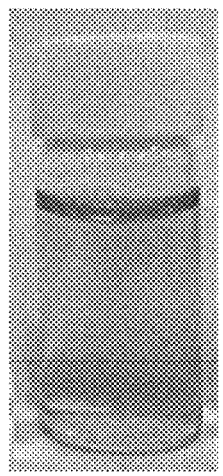

The results of evaluation of antioxidant activities of Example 1, Comparative Example 1 and Comparative Example 2 through a methyl violet method are shown in FIGS. 4A to 4C. FIG. 4A shows the result of Example 1, FIG. 4B shows the result of Comparative Example 1, and FIG. 4C shows the result of Comparative Example 2.

As shown in FIG. 4B, the methyl violet test solution of Comparative Example 1 with no antioxidant added thereto gradually became colorless. As shown in FIG. 4C, the methyl violet test solution of Comparative Example 2, when cerium oxide ($CeO_2$) was present as an antioxidant, turned much paler.

On the other hand, as shown in FIG. 4A, Example 1, when the tin-doped cerium oxide according to an exemplary embodiment of the present invention was present as an antioxidant, maintained its original violet color very well.

Accordingly, the tin-doped cerium oxide according to the present invention may exhibit the best antioxidant activity.

2) Antioxidant Activity Evaluation—UV-Visible Spectroscopy

The absorbance intensities of the methyl violet test solutions of Example 1, Comparative Example 1 and Comparative Example 2 were measured using a UV-visible spectrometer (UV-3600, Shimadzu Corporation, Japan) to more accurately evaluate the antioxidant activity.

When the antioxidant activity of the antioxidant is exerted, an absorbance intensity is present at 582 nm, which is the inherent absorbance wavelength of methyl violet, whereas, when antioxidant activity is not exerted, no absorbance intensity is present at the corresponding wavelength.

The methyl violet test solutions according to Example 1, Comparative Example 1 and Comparative Example 2 were stirred for 24 hours and then the antioxidants were removed through a centrifugation process. The absorbance intensities of the remaining solutions were measured. The results are shown in FIG. 5.

Figure 5:
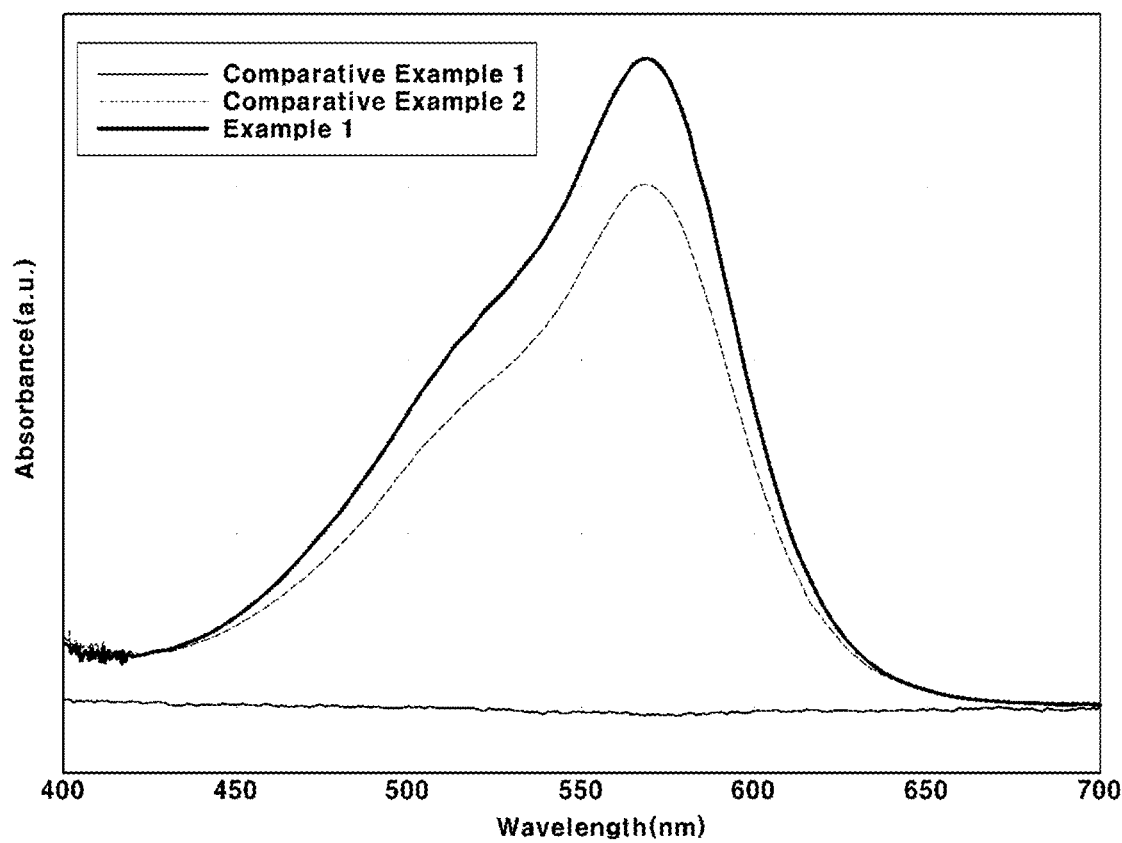
FIG. 5 shows the results of evaluation of antioxidant activities of Example 1, Comparative Example 1 and Comparative Example 2 using UV-visible spectroscopy.

As shown in FIG. 5, Comparative Example 1, with no antioxidant added thereto, did not show an absorbance peak, whereas Example 1, in which the tin-doped cerium oxide according to an exemplary embodiment of the present invention was present as an antioxidant, maintained a higher absorbance intensity at a wavelength of about 582 nm than Comparative Example 2, in which cerium oxide ($CeO_2$) was present as an antioxidant.

Long-Term Durability Evaluation

An electrolyte membrane including the tin-doped cerium oxide according to an exemplary embodiment of the present invention as an antioxidant was produced as follows:

(Example 2) 2% by weight of $Sn_{0.25}Ce_{0.75}O_{2-\delta}$ (wherein $\delta$ is an oxygen vacancy value making the compound of Formula 1 electrically neutral) as an antioxidant was mixed with a perfluorinated sulfonic acid ionomer dispersion (Nafion D2021, DuPont Co., USA), and the resulting mixture was subjected to bar coating to produce an electrolyte membrane. The electrolyte membrane had a thickness of 30 μm.

(Comparative Example 3) An electrolyte membrane was produced in the same manner as in Example 2, except that no antioxidant was added.

(Comparative Example 4) An electrolyte membrane was prepared in the same manner as in Example 2, except that cerium oxide ($CeO_2$) was used as an antioxidant.

The long-term durability of the electrolyte membranes according to Example 2, Comparative Example 3 and Comparative Example 4 were evaluated as follows.

Deionized water and hydrogen peroxide were mixed at a weight ratio of 1:0.43, and 30 ppm of iron sulfate heptahydrate was added to the resulting mixture to prepare a Fenton solution. The electrolyte membranes according to Example 2, Comparative Example 3, and Comparative Example 4 were immersed in the Fenton solution and reacted at temperature of about 80° C., and the fluorine ion concentration was measured at various time points during the reaction.

The electrolyte membranes were degraded by radicals contained in the Fenton solution to release fluorine ions ($F^-$). When the antioxidant is added to the electrolyte membrane, the antioxidant may remove radicals, thereby suppressing the release of the fluorine ions. Thus, by measuring the concentration of the released fluorine ions, the antioxidant activity of the antioxidant and the durability of the electrolyte membrane can be evaluated.

Figure 6:
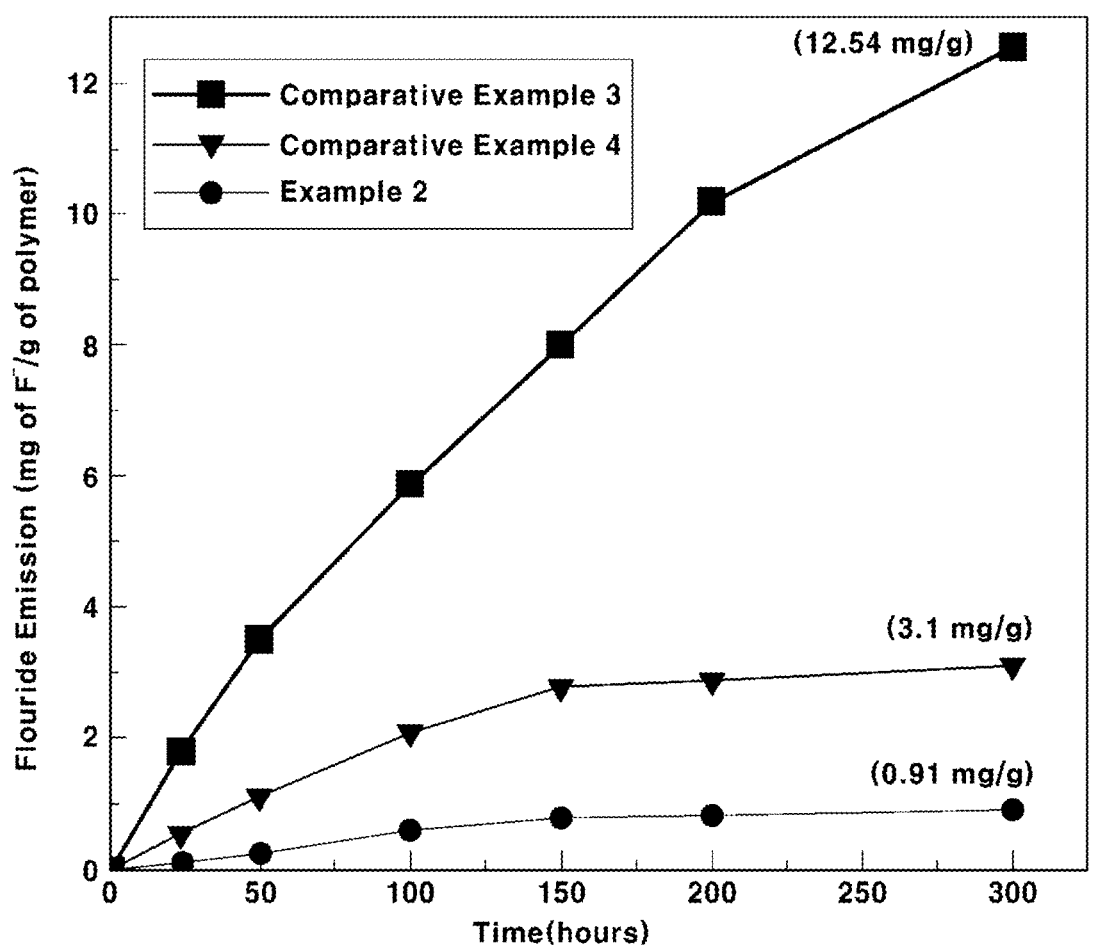
FIG. 6 shows the results of evaluation of the long-term durability of the electrolyte membranes according to an exemplary embodiment (Example 2) of the present invention, Comparative Example 3 and Comparative Example 4.

The results are shown in FIG. 6. Based on the results of the reaction time of 300 hours, the fluorine ion concentration of Example 2 including the tin-doped cerium oxide according to an exemplary embodiment of the present invention as an antioxidant was about 1/13 of that of Comparative Example 3 with no antioxidant added thereto, and was about 1/3 of that of Comparative Example 4, containing the cerium oxide as an antioxidant.

Accordingly, the tin-doped cerium oxide according to exemplary embodiments of the present invention may have high antioxidant activity and the electrolyte membrane including the tin-doped cerium oxide has excellent long-term durability.

As apparent from the foregoing, the present invention provides a novel antioxidant having excellent antioxidant activity as well as superior long-term stability, and thus a membrane-electrode assembly to which the antioxidant is introduced is capable of exhibiting greatly improved durability.

The effects of the present invention are not limited to those mentioned above. It should be understood that the effects of the present invention include all effects that can be inferred from the foregoing description of the present invention.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A membrane-electrode assembly for fuel cells comprising:
    an electrolyte membrane comprising a perfluorinated sulfonic acid-based ionomer and an antioxidant; and
    a pair of electrodes formed on both surfaces of the electrolyte membrane,
    wherein at least one of the electrolyte membrane and the electrodes comprises the antioxidant,
    wherein the electrolyte membrane comprises the antioxidant in an amount of about 0.05 wt % to 20 wt % based on a total weight of the perfluorinated sulfonic acid-based ionomer and the antioxidant,
    wherein the antioxidant comprising tin (Sn) and cerium oxide,
    wherein the cerium oxide is doped with the tin (Sn), and
    wherein the Sn-doped cerium oxide is represented by the following Formula 1:

$$Sn_xCe_{1-x}O_{2-\delta} \qquad \text{[Formula 1]}$$

wherein x satisfies $0<x\leq0.5$ and $\delta$ is an oxygen vacancy value making the compound of Formula 1 electrically neutral.

2. The membrane-electrode assembly according to claim 1, wherein the electrolyte membrane further comprises a porous reinforcement layer,
    wherein the electrolyte membrane comprises the perfluorinated sulfonic acid-based ionomer and the antioxidant impregnated into the reinforcement layer.

3. A fuel cell comprising the membrane-electrode assembly according to claim 1.

4. A vehicle comprising the fuel cell according to claim 3.

* * * * *